UNITED STATES PATENT OFFICE.

MARTINUS H. CARON, OF WELTEVREDEN, JAVA, DUTCH EAST INDIA.

PROCESS FOR EXTRACTING GOLD AND SILVER FROM ORE CONTAINING GOLD, SILVER, AND MANGANESE DIOXID.

1,232,216.            Specification of Letters Patent.            Patented July 3, 1917.

No Drawing.        Application filed April 18, 1916.  Serial No. 92,069.

*To all whom it may concern:*

Be it known that I, MARTINUS HENDRICUS CARON, mining engineer, residing at Weltevreden, Java, Dutch East India, have invented certain new and useful Improvements in a Process for Extracting Gold and Silver from Ore Containing Gold, Silver, and Manganese Dioxid; and I do hereby declare the following to be a full, clear, and exact description of the invention, such as will enable others skilled in the art to which it appertains to use the same.

It is generally known that with certain kinds of ore containing silver or silver and gold in addition to a high percentage of manganese dioxid (especially oxidation ore) the amalgamation and cyanidation processes result in a very unsatisfactory silver extraction.

This low silver extraction is due to the presence of manganese dioxid, this substance apparently increasing the very fine particles of silver compounds with a thin film, or otherwise associating itself with them, in such a way as to prevent normal action of mercury and cyanid on the said silver compounds.

The object of the present invention is a process in which this objection is overcome. In the said process, such ore is first subjected to a reducing roast, after which it is subjected either to amalgamation or cyanidizing treatment, whereby good extraction of the gold and silver is accomplished. With this process very good results have been obtained, the manganese dioxid being reduced by CO, or other reducing agents, to manganous oxid (MnO), the silver compounds simultaneously being reduced to metallic silver.

The results obtained show a silver extraction vaying from 93 to 99 per cent. The ore containing a high percentage of silver shows the highest extractions.

A process is already known for treating such silver ore, according to which the ore is exposed to a chloridizing roast before being amalgamated and cyanidized, this process giving a satisfactory silver extraction; however, in case the ore also contains gold, the process is open to objection due to the vaporization of gold in the form of auric chlorid ($AuCl_3$).

The economical advantages of the process of my present invention over the chloridizing roast process for treating ore containing gold, silver and manganese dioxid, are the following:

(*a*). High expenses for the salts required in the chloridizing roast are avoided.

(*b*). Losses of gold by vaporization, for example in the form of $AuCl_3$ are avoided.

(*c*). The silver being converted into the metallic state, a quick and high cyanid extraction is obtained with the slimes treatment, thus resulting in a low cyanid consumption.

I claim:

An improvement in the extraction of gold and silver from ore containing manganese dioxid in addition to silver or gold and silver, said improvement consisting in first exposing the ore to a preparatory reducing roast, and thereafter recovering the values by cyanidation or amalgamation.

In testimony whereof I have signed my name to this specification, in the presence of two subscribing witnesses.

M. H. CARON.

Witnesses:
  VIBBEL,
  C. HOVI.